United States Patent

[11] 3,597,768

[72] Inventor Arthur Walter Wofford
11259 Hollyhock, Sante Fe Springs, Calif. 90670

[21] Appl. No. 43
[22] Filed Jan. 2, 1970
[45] Patented Aug. 10, 1971

[54] HOLDING TANK FOR MOBILE VEHICLE
6 Claims, 7 Drawing Figs.

[52] U.S. Cl. .......... 4/10, 4/115
[51] Int. Cl. .......... E03d 1/00, E03d 3/00, E03d 5/00
[50] Field of Search .......... 4/10, 1, 2, 8, 114, 115

[56] References Cited

UNITED STATES PATENTS

| | | | |
|---|---|---|---|
| 1,303,358 | 5/1919 | Montgomery | 4/10 X |
| 2,865,028 | 12/1958 | Patenaude | 4/10 |
| 3,005,205 | 10/1961 | Breen | 4/115 X |
| 3,044,077 | 7/1962 | Belden | 4/10 |
| 3,183,525 | 5/1965 | O'Brien et al. | 4/10 X |
| 3,472,390 | 10/1969 | Pall et al. | 4/10 X |
| 3,474,467 | 10/1969 | Stinson | 4/10 |

*Primary Examiner*—Henry K. Artis
*Attorney*—William C. Babcock

ABSTRACT: A holding tank for a mobile vehicle having a toilet, said tank having means incorporated in the interior thereof for discharging solid waste material and water from said toilet direct to a sewer line without contaminating the interior of the tank when said vehicle is parked in a trailer lot, but said tank capable of receiving waste material and water for future disposal when said vehicle is being driven or parked at a location where sewer facilities are not available.

8 2 22 20 10 18 14

18 12 5 2 28 24 34 32

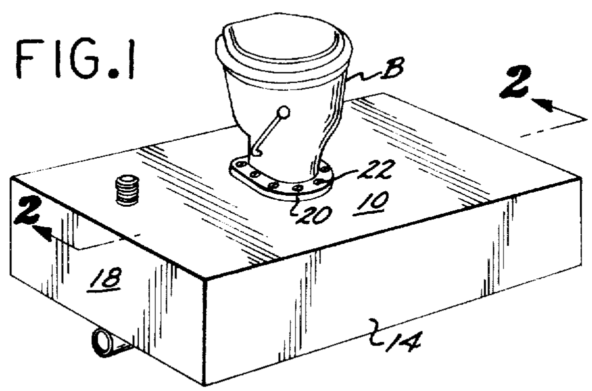
FIG.5
34
FIG.6
10'
46
A'
30'
42
44
32'
34'
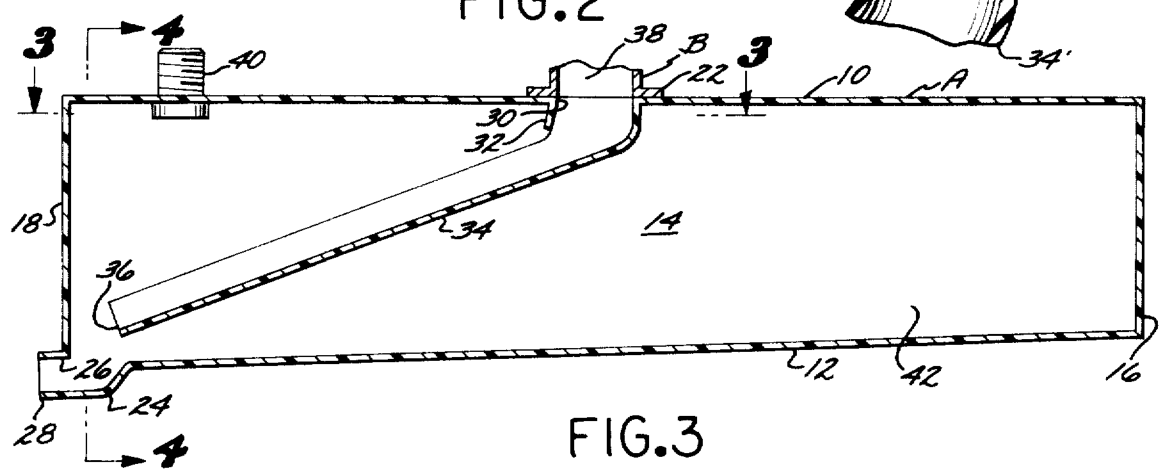
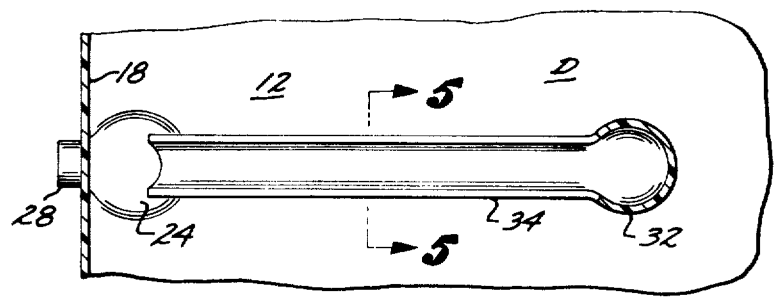
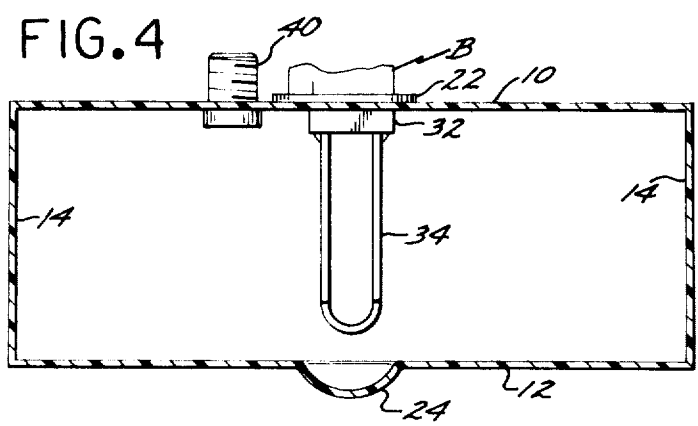
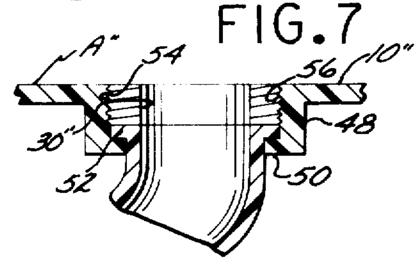
INVENTOR.
ARTHUR WALTER WOFFORD
BY
William Q. Babcock
ATTORNEY

HOLDING TANK FOR MOBILE VEHICLE

BACKGROUND OF THE INVENTION

1. Field of the Invention

An improved holding tank for use on a mobile vehicle having a toilet.

2. Description of the Prior Art

The great majority of automotive trailers now in use include toilets as a part thereof. Discharge of water and waste products from a toilet in a trailer is to a holding tank mounted on the vehicle. When a trailer is parked at a location having sewer facilities, the holding tank is removably connected to the latter. The holding tank under such conditions only momentarily contains liquid as the toilet is flushed, with solid waste material as a result tending to cling to the interior of the tank to give rise to an undesirable odor.

The holding tank that is the subject of the present application has means embodied in the interior thereof that discharges liquids and solid waste material directly to a sewerline when the vehicle on which the tank is mounted is in a trailer park, but with the tank capable of receiving both liquids and solid waste materials for subsequent disposal when the trailer is being moved or is positioned at a location where sewer facilities are not available. A holding tank of the structure described and claimed in the present application overcomes the operational disadvantages of previously available holding tanks wherein solid waste material tends to cling to the interior surfaces of the tank when the tank is connected to a sewerline.

SUMMARY OF THE INVENTION

An improved holding tank that is adapted to be mounted on a mobile vehicle and connected to a toilet that is also secured to the vehicle. This tank includes a downwardly sloping discharge member in the interior thereof that conveys liquid and solid waste from an inlet in the tank to an outlet therein when the outlet is connected to a sewerline, but permits liquid and solid waste to discharge into the tank when the outlet is in a closed position.

A major object of the present invention is to provide a mobile vehicle holding tank that may be used to either receive liquid and solid waste materials therein for future disposal, or discharge such waste materials to a sewerline when said tank is connected thereto.

Another object of the invention is to furnish a holding tank for use in a mobile vehicle that flushes clean when connected to a sewerline, and as a result the possibility of objectionable odors arising from the tank being minimized.

A still further object of the invention is to supply a mobile vehicle-holding tank that has an extremely simple mechanical structure, is simple and easy to use, requires little or no maintenance, can be fabricated from standard commercially available materials, and retailed at a sufficiently low price as to encourage the widespread use thereof.

BRIEF DESCRIPTION OF THE DRAWINGS

FIG. 1 is a perspective view of the holding tank connected to a toilet;

FIG. 2 is a longitudinal cross-sectional view of the tank taken on the line 2–2 of FIG. 1;

FIG. 3 is a fragmentary longitudinal cross-sectional view of the tank taken on the line 3–3 of FIG. 2;

FIG. 4 is a transverse cross-sectional view of the tank taken on line 4–4 of FIG. 2;

FIG. 5 is a transverse cross-sectional view of the waste discharge member taken on the line 5–5 of FIG. 3;

FIG. 6 is a vertical cross-sectional view of a first alternate connection between the waste discharge member and upper inlet portion of the holding tank; and FIG. 7 is a vertical cross-sectional view of a second alternate connection between the waste discharge member and upper inlet portion of the holding tank.

DESCRIPTION OF THE PREFERRED EMBODIMENTS

The holding tank A as may best be seen in FIG. 1 is shown as being connected to a conventional toilet B of the type used in mobile vehicles (not shown). Tank A is preferably rectangular in shape and is defined by a top 10, flat longitudinally sloping bottom 12, two sidewalls 14, and first and second end walls 16 and 18 respectively. The toilet B is of conventional design, and includes a lower flange 20 that by screws 22 or other conventional fastening means is secured to the top 10.

Bottom 12 as shown in FIG. 2 slopes downwardly at a gentle angle from first end wall 16 to second end wall 18. The central portion of bottom 12 adjacent to second end walls 18 has a recess 24 therein. The recess 24 is in communication with a waste discharge opening 26 formed in second end wall 18, from which opening a tubular member 28 extends as shown in FIG. 2. The tubular member 28 is in communication with a waste discharge control valve C of conventional design that may be connected to a sewer inlet (not shown) when the vehicle on which the tank A is mounted is in a trailer park. The valve C will normally be in the open position when the vehicle (not shown) is so located. When the vehicle (not shown) is being moved or in a location where there are no sewer facilities the valve C will be closed.

Tank A as shown in FIG. 2 has a waste inlet opening 30 in the upper central portion thereof that is in communication with a short downwardly extending tubular section 32 that develops into a trough 34. The trough 34 slopes downwardly towards bottom 12, and terminates in lower extremity 36 that is disposed adjacent to recess 24. The lower extremity 36 is so located that liquid and waste material flowing downwardly in trough 34 will discharge into recess 24. The flange 20 is so positioned on top 10 as may best be seen in FIG. 2 that the lower interior 38 of toilet B is in communication with opening 30. A threaded tubular member 40 is secured to the top 10 and is in communication with the interior 42 of tank A. A hose (not shown) may be connected to member 40 to flush out the interior D of tank A in a maintenance operation.

The use and operation of the invention is extremely simple. When the vehicle (not shown) on which the tank A is mounted is being moved from place to place, or the vehicle is positioned at a location having no sewer facilities, the valve C is in the closed position, and solid waste material and liquids will discharge into the tank A when toilet B is flushed. Such waste material will be subsequently discharged from the tank A when the vehicle (not shown) on which the tank is mounted reaches a trailer park having sewer facilities. Waste material is discharged from tank A at such a location by connecting a flexible hose (not shown) to valve C and to the sewer inlet (not shown), and opening valve C. The lower extremity 36 of trough 34 is located a sufficient distance above bottom 12 as to not interfere with the flow of waster material from tank A when the contents of the latter are being dumped into a sewer.

After the valve C is connected to a sewer inlet (not shown) as above described, and during the time the vehicle (not shown) on which the tank A remains in a trailer park, the valve C is maintained in an open position. Solid waste material and liquids from the toilet B now flow downwardly in the trough 34 to discharge into recess 24, and then flow through valve C to the sewer inlet. When the tank A is so used solid waste material will not cling to the interior surfaces of the tank, and the possibility of objectionable odors arising from the tank is substantially eliminated.

A first alternate form of the tank A′ is partially shown in FIG. 6 that is of the same structure as the tank A previously described other than as to the means by which the trough 34′ is supported therefrom. The same numerals are used in identifying elements in the first alternate form A of the tank A′ shown in FIG. 6 as used in the first described form thereof but with a prime being added thereto. Opening 30′ is partially defined by a ring 42 that extends downwardly from top 10′. Ring 42 has a circumferentially extending groove 44 on the interior surface thereof, which groove is preferably of semicircular transverse cross section.

Trough 34′ has a tubular section 32′ on the upper end thereof that snugly engages the interior of ring 42. Tubular section 32′ has a groove 46 formed on the exterior surface thereof that may be vertically aligned with groove 44. A resilient snap ring 48 engages groove 44 and 46 and serves to hold trough 34′ in a fixed position relative to tank A′.

A second alternate form of tank A″ is partially shown in FIG. 7 that is of the same structure as tank A first described, other than as to the means that secures the trough 34″ to the top 10″. Inlet opening 30″ is partially defined by a tubular member 48 as shown in FIG. 7 that terminates in an inwardly extending first flange 50. Trough 34″ terminates at the upper end thereof in a tubular member 32″ that has a second flange 52 projecting outwardly therefrom that seats on the upper surface of first flange 50. An externally threaded ring 54 engages threads 56 formed on the interior surface of tubular member 48 as shown in FIG. 7. The ring 54 bears against the upper surface of first flange 50, and serves to hold the trough 34″ in a fixed position in tank A″. The threaded member 40 is normally closed by a vented cap (not shown).

I claim:

1. The combination with a mobile vehicle toilet and a waste control valve of a holding tank that includes a top having an inlet opening therein that is in communication with the interior of said toilet, first and second end walls and a pair of sidewalls that extend downwardly from said top and are connected to a bottom that slopes downwardly from said first end wall towards said second end wall, a recess in said bottom adjacent to said second end wall, a tubular waste discharge member that extends outwardly from said second end wall and is in communication with said recess, said valve in communication with said tubular waste discharge member and controlling the flow of material therethrough, said tank being characterized by:

a. a short tubular member inside said tank that occupies a fixed position relative to said top and is in communication with said inlet opening; and b. rigid fluid-conducting means inside said tank that extends downwardly at a substantial angle from said tubular member to terminate above said bottom, with the lower extremity of said fluid-conducting means being so located relative to said recess that waste products flowing through fluid-conducting means will discharge therein, said valve when in an open position allowing liquid and waste products discharged into said fluid-conducting means from said toilet to flow from said tank by only contact with said recess in said bottom, said waste discharge member and said valve to minimize the possibility of said tank emitting objectionable odors, said valve when closed containing said waste materials in said tank for future disposal, and said lower extremity being spaced above said bottom a sufficient distance as to not interfere with the free flow of waste material that has accumulated in said tank when said valve is placed in an open position to discharge said waste material to a sewer inlet.

2. A holding tank as defined in claim 1 in which said tank, tubular member and fluid-conducting means are formed as an integral unit.

3. A holding tank as defined in claim 1 in which said fluid-conducting means is a trough that is in communication with said tubular member.

4. A holding tank as defined in claim 1 in which said fluid-conducting means is a trough that is connected to said tubular member.

5. A holding tank as defined in claim 1 in which said inlet opening is partially defined by a first tubular member that is slidably engaged by said short tubular member, said tubular members having adjacently disposed aligned circumferentially extending grooves therein, and in addition a snap ring that engages said grooves to support said short tubular member from said first tubular member.

6. A holding tank as defined in claim 1 in which said inlet opening is partially defined by a first tubular member that includes a first inwardly extending flange, and said short tubular member includes a second outwardly extending flange that abuts against said first flange when said short tubular member is extended downwardly through said first tubular member, and in addition an externally threaded ring that engages threads formed on the interior of said first tubular member, with said ring being in abutting contact with said second flange to support said short tubular member from said first tubular member.